United States Patent Office 2,726,228
Patented Dec. 6, 1955

2,726,228

RESINS PREPARED FROM UNSATURATED KETONES

Ralph B. Thompson, Hinsdale, Ill., assignor to Universal Oil Products Company, Chicago, Ill., a corporation of Delaware No Drawing. Application November 21, 1951, Serial No. 257,639

7 Claims. (Cl. 260—63)

This application is a continuation-in-part of my co-pending application Serial No. 59,191, filed November 9, 1948, now abandoned.

This invention relates to a process for the manufacture of resins useful in the formulation of coating compositions, in the production of thermoplastic, molded objects, as a cloth impregnant to form flexible fabrics impervious to gases and water and for other uses common to resins having the properties hereinafter described for the present resinous condensation products.

The resinous materials provided by the process of this invention are formed by interaction and condensation of two classes of reactants: a pentadienone having the structure of a di-alpha, beta-diolefinic ketone and an organic compound containing a dihydrogen substituted carbon atom activated by an unsaturated radical selected from the group consisting of carboxyl, carbonyl, carboalkoxy, cyano, and nitro radicals attached in a position alpha to said dihydrogen substituted carbon atom.

A specific embodiment of the invention concerns a process for the production of a resin by the condensation of resinifying reaction proportions of the reactants; dibenzalacetone and nitroethane dissolved in a solvent for said reactants and in the presence of an alkali metal hydroxide, separating an initial condensation product from the reaction mixture and heating the thus separated product to a temperature of from about 135° to about 300° C.

Other embodiments of the invention referring to specific reactants, reaction conditions required to effect the condensation of said reactants, and to other factors involved in the production of the present resinous products will be referred to in greater detail in the following description of the invention.

The condensation of a di-alpha, beta-diolefinic ketone such as pentadienone and its substituted analogs and homologs with an organic compound containing a dihydrogen-substituted carbon atom (that is, a methylene group) alpha to an unsaturated radical such as keto, carboxyl, etc. has heretofore been accomplished by the art. It is known, for example that dibenzalacetone and dimethyl malonate condense at the temperature of boiling methanol and in the presence of sodium methylate to yield three different substances, depending upon the molar ratio of the reactants charged to the condensation reaction, in accordance with the following mechanism:

$C_6H_5CH=CHCOCH=CHC_6H_5 + CH_2(CO_2CH_3)_2 \rightleftharpoons$
I                                                    III

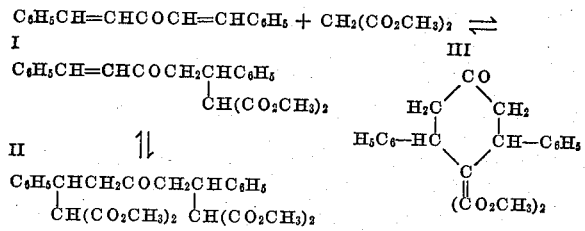

In a similar manner, other compounds containing a dihydrogen-substituted carbon atom alpha to an unsaturated radical such as cyano, carbonyl, nitro and carboalkoxy may be utilized in the condensation reaction to form compounds analogous to I, II, and III with the corresponding substituent groups in the condensation product.

It has now been discovered that a useful resinous material may be prepared by heating the reaction product designated as II or an equimolecular mixture of n moles each of I and III to a temperature of at least 135° C., the particular reaction temperature being dependent upon the reactants entering into the condensation reaction, to form a resin having essentially the structure:

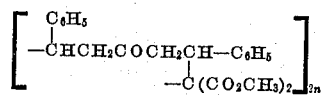

The present invention concerns a process for the preparation of such products and the resins formed thereby.

The di-alpha, beta-diolefinic ketones or pentadienones used as starting materials in the process are represented structurally by the formula:

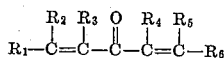

in which each of the substituents $R_1$ to $R_6$ inclusive, are selected from the group consisting of hydrogen, alkyl, aryl, cycloalkyl, alkaryl, aralkyl, and such heterocyclic radicals as furyl, thienyl, pyridyl and the like. The preferred ketones of the above structure utilizable in the present process contain a hydrogen substituent on the unsaturated beta carbon atoms; that is, groups $R_2$ and $R_5$ are preferably hydrogen atoms, as represented by such compounds as pentadienone, 1-methyl-1,4-pentadiene-3-one, 1,5-dimethyl-1,4-pentadiene-3-one, 1-phenyl-1,4-pentadiene-3-one, and dibenzalacetone. Other typical di-alpha, beta-diolefinic ketones includes such compounds as difurfuralacetone, phorone, dicyclohexylidenecyclohexanone, dicinnamalacetone, dicyclohexylideneacetone, etc.

Organic compounds of the class containing a dihydrogen-substituted carbon atom alpha to an unsaturated radical which activates the two hydrogen atoms substituted on the adjacent alpha carbon atoms, are represented by the empirical formula:

$$R-\underset{H}{\overset{H}{C}}-X$$

where X is selected from the carboxyl, carbonyl, carboalkoxy, cyano, and nitro radicals and R is hydrogen, alkyl, aralkyl, cycloalkyl, or such heterocyclic radicals as pyridyl, thienyl or furyl and the like. Alternatively, R may be an additional unsaturated activating group selected from the above specific radicals. When referred to herein, the unsaturated activating groups are the carboxyl group represented by the empirical formula:

the carbonyl group represented by the formula:

the carboalkoxy group represented by the formula:

where Y is an alkyl group, the cyano group represented by the formula: $-C \equiv N$, and the nitro group represented by the formula: $-NO_2$. The methylene group is represented by the formula:

Organic compounds within the group thus specified include the esters, ketones, aldehydes, nitriles, and the nitroparaffins and their derivatives. Typical representative compounds of the class containing a carboxyl or carboalkoxy group are, for example the mono- and polycarboxylic acids and their esters such as acetic acid, propionic acid, etc.; methyl acetate, ethyl acetate, etc.; malonic acid, dimethyl malonate, diethyl malonate, etc.; esters of acetoacetic acid; and homologs of the above compounds. Carbonyl compounds utilizable in the preparation of the present resinous materials include the aldehydes and ketones such as the aliphatic compounds of these classes, including such typical representative members of the above classes as acetaldehyde and its homologs, methyl ethyl ketone and its homologs, etc. Organic compounds containing a dihydrogen-substituted carbon atom adjacent to a nitro radical include particularly the nitroalkanes, such as nitroethane and its homologs. Typical representative compounds containing a cyano group are the nitriles, such as malononitrile, acetonitrile, propionitrile, etc. The above compounds may contain other substituents attached to carbon atoms other than the activating group and the dihydrogen-substituted group or methylene radical, said substituents having the tendency to modify the physical and chemical properties of the resulting resinous product formed by the condensation of the alpha, beta-diolefinic ketone reactant therewith. Thus, one or more phenyl and substituted phenyl radicals, which may be attached to individual carbon atoms of the unsaturated radicals substituted on the carbonyl group of the diolefinic ketone (preferably in a position remote from the carbonyl group), generally increase the softening point of the resinous product by virtue of the increase in the molecular weight of the resulting product. Other substituent radicals such as hydroxyl, halo, etc., alter the softening point as well as the solubility of the resin in various solvents. Olefinic, polyolefinic, and acetylenic unsaturation in the structure of the organic radical attached to the carbonyl group of the unsaturated ketone through intermediate methylene groups also markedly affect the properties of the final resin obtained by the process herein provided.

The condensation reaction of the present process proceeds readily to form a resin or a resin intermediate capable of forming said resin by heating the intermediate condensation product to a temperature usually above the boiling point of water, and preferably, above about 135° C., up to about 300° C., at a pressure sufficient to maintain the reactants substantially in liquid phase. The initial condensation reaction which forms the resin intermediate is effected in the presence of an acidic or basic condensation catalyst preferably a relatively strong base, including such bases as sodium hydroxide, potassium hydroxide, pyridine, piperidine, sodium methylate, and other alkali metal alcoholates, the quaternary ammonium hydroxide compounds, such as trimethylbenzyl ammonium hydroxide, and the like. Suitable acidic catalysts include the anhydrous hydrogen halides, phosphorous pentoxide, tetra-phosphoric acid, and the aluminum halide alcoholates, ketonates, and etherates, such as aluminum chloride monomethanolate, a boron trifluoride etherate, such as boron trifluoride diethyl-etherate, etc. The catalysts, where desirable in the ultimate resinous products, may be removed therefrom by dissolving the resin in a solvent in which either the catalyst is insoluble and the resin is soluble or in which the resin is insoluble and the catalyst is soluble and thereafter separating the resulting phases. Thus, for example, the resin containing the catalyst may be dissolved in a solvent, such as acetone, and the solution thereafter mixed with water to precipitate the resin therefrom, the aqueous acetone solution generally retaining the catalyst dissolved therein. In many instances, the presence of the catalyst in the resinous product is not undesirable, as for example, when a catalyst such as a quaternary ammonium hydroxide base or piperidine is employed. The catalyst is generally utilized in small quantities, from about 0.1 to about 5% by weight of the reaction mixture, such that if allowed to remain in the product, the properties of the resin are not seriously affected thereby. In such a procedure, the condensation reaction mixture containing the catalyst may be heated directly to form the resinous product without intermediate separation of the condensation product. Where, however, the catalyst, solvent, etc. are desirably removed from the condensation reaction mixture and the separated resin intermediate separately heated to form the final resin, the recovered resin intermediate is thereafter heated to a temperature of from about 135° to about 300° C. to form the resin product herein provided.

The condensation reaction of the unsaturated ketone with the organic reactant containing a dihydrogen-substituted carbon atom alpha to an unsaturated radical to form the resin intermediate herein is believed to proceed via a Michael condensation mechanism in which the activated hydrogen atoms alpha to the carboxyl, carbonyl, carboalkoxy, cyano or nitro radical add to the alpha carbon atom and the organic residue adds to the beta carbon atom, thereby forming a condensation product represented by the empirical formulas I, II and III hereinabove noted and comprising the resin intermediate of the present process. Subsequent heating increases the length of these chains and forms the final resinous product. The resulting products, which are of relatively high molecular weight, are generally clear thermoplastic resins which may be molded or otherwise shaped to form structural shapes, etc.

The process may be effected batchwise or on a continuous basis by mixing the respective reacting components and heating the mixture up to about 100° C. in the presence of a suitable catalyst to initiate the reaction, while maintaining the reaction mixture under several atmospheres of pressure to insure substantially liquid phase conditions. The reaction is usually exothermic and proceeds vigorously following the initial mixing and heating of the reactants to a temperature at which the reaction proceeds. Following the completion of the initial condensation reaction or as the culmination of a one-step procedure, the resulting product or resin intermediate may be additionally treated in an appropriate manner to introduce other radicals on the high molecular weight resin molecules or convert the radicals appearing in the structure of the resin molecule to radicals of a different chemical character. Thus, for example, when a nitro paraffin is utilized as the organic compound containing a dihydrogen-substituted carbon atom alpha to the nitro group, the resinous product formed by condensing the nitro paraffin with the unsaturated ketone reactant, may be hydrogenated or otherwise reduced to form a resinous product containing one or more amino groups. In another instance, for example, when a carboxylic acid ester is utilized as the reactant condensed with the unsaturated ketone reactant, the resulting resinous product may be subjected to hydrolysis to convert the ester groups into free carboxylic acid groups. Reaction of the free carboxyl groups with polyhydric alcohols will introduce cross linking and a thermo-setting resin.

The rate of condensation reaction may be further altered by dissolving the reactant in an inert diluent such as a paraffinic hydrocarbon or dialkyl ether. The diluent may be further selected on a basis of its boiling point, for example, to provide reflux during the condensation reaction and thereby control the temperature of the reaction mixture at the boiling point of the diluent. When utilizing a diluent, the reactants are preferably dissolved therein prior to the addition of the catalyst to the reaction mixture, or at least prior to heating the reaction mixture to initiate the condensation reaction. Following completion of the resin or resin intermediate-forming reaction, the reaction product may be subjected to distillation, for example, at sub-atmospheric pressure or under fractionating conditions to separate the final product from unconverted reactants and/or diluent present in the final reaction mixture. The distillation residue, which may comprise either a partially resinified or totally resinified product, may be recovered and further heated to either complete the resinification reaction or, in some cases, thermally set the reaction mass.

The process of the present invention is further illustrated with reference to the following examples. In thus specifying particular reactants and reaction conditions in said examples, it is not intended thereby to limit the generally broad scope of the invention in strict accordance therewith.

Example I

A resinous product containing nitro groups in the structure thereof was prepared by the following procedure. 4.7 grams of dibenzalacetone (0.02 mol) and 1.6 grams of nitro-methane (0.02 mol) were dissolved in 20 cc. of methanol and two drops of 30% potassium hydroxide added to the resulting solution. The reaction mixture was heated for a short time on a steam bath to the boiling point of the methanol at atmospheric pressure under reflux; an insoluble white powder precipitated during the course of the reaction. The powder was filtered from the alcohol and dried to remove adhering methanol. The powder was converted to a clear, yellow resin by heating in a bath at 200° C. The resin was a hard, yellow, thermoplastic solid when cool and could be re-softened by heating the finished resin to a temperature of approximately 200° C. The powdered resinous material could be molded into various shapes and forms by heating the initial powder or resin intermediate in a mold under pressure at a temperature below 200° C.

Example II

Utilizing the procedure employed in the above Example I, 4.7 grams of dibenzalacetone (0.02 mol) and 3.2 grams of diethyl malonate (0.02 mol) were heated on a steam bath in the presence of a few drops of trimethyl benzylammonium hydroxide for 16 hours. The resulting reaction formed a product which was converted to a hard, reddish, thermoplastic resin by heating to 200° C. The material was slightly soluble in acetone following the resinification reaction.

Example III

A clear, amber-colored resinous material was prepared by reacting equi-molecular proportions of phorone and acetophenone on a steam bath in the presence of a few drops of piperidine for a reaction period of about 10 hours and thereafter heating the mixture under pressure to 250° C. The reaction product is a thermoplastic resin and may be utilized to form variously shaped, molded articles.

I claim as my invention:

1. A process for the production of a resin which comprises reacting at condensation reaction conditions and in the presence of a basic condensation catalyst a pentadienone having the structure of a di-alpha, beta-olefinic ketone with an organic compound containing a dihydrogen-substituted carbon atom adjacent to a radical selected from the group consisting of carboxyl, carbonyl, carboalkoxy, cyano and nitro and thereafter heating the resulting condensation product to a temperature of from about 200° to about 300° C. to form said resin.

2. The process of claim 1 further characterized in that said basic condensation catalyst is an alkali metal alcoholate.

3. The process of claim 1 further characterized in that said basic condensation catalyst is an aqueous alkali metal hydroxide solution.

4. The process of claim 1 further characterized in that an equimolecular proportion of said pentadienone and said organic compound are reacted at said condensation reaction conditions.

5. A process for the preparation of a resin which comprises reacting pentadienone and nitroethane, in equimolecular proportions in the presence of a basic condensation catalyst at reaction conditions, separating the condensation product from the basic condensation catalyst and thereafter heating said condensation product to a temperature of from about 200° to about 250° C. to form said resin.

6. The process of claim 5 further characterized in that said basic condensation catalyst is sodium methylate.

7. A process for the production of a resin which comprises reacting dibenzalacetone with an equimolecular proportion of diethylmalonate at condensation reaction conditions in the presence of a basic condensation catalyst, separating the resulting condensation product from the reaction mixture and thereafter heating said condensation product to a temperature of from about 200° to about 250° C. to form said resin.

References Cited in the file of this patent

UNITED STATES PATENTS

| | | |
|---|---|---|
| 2,309,727 | Barnes | Feb. 2, 1943 |
| 2,330,337 | Cupery | Sept. 28, 1943 |
| 2,332,897 | D'Alelio | Oct. 26, 1943 |
| 2,363,829 | Caplan et al. | Nov. 28, 1944 |
| 2,461,510 | Harvey | Feb. 15, 1949 |

FOREIGN PATENTS

| | | |
|---|---|---|
| 496,276 | Great Britain | Nov. 28, 1938 |

OTHER REFERENCES

Borsche: Liebig's Annalen, vol. 375, 1910, pages 169–175.

Kohler et al.: Journ. Amer. Chem. Soc., vol. 46, May 1924, pages 1267, 1270–1274.